Dec. 16, 1958  G. B. BRANDS  2,864,331
PROTECTOR FOR HIGHWAY MARKINGS
Filed Nov. 7, 1955  3 Sheets-Sheet 1
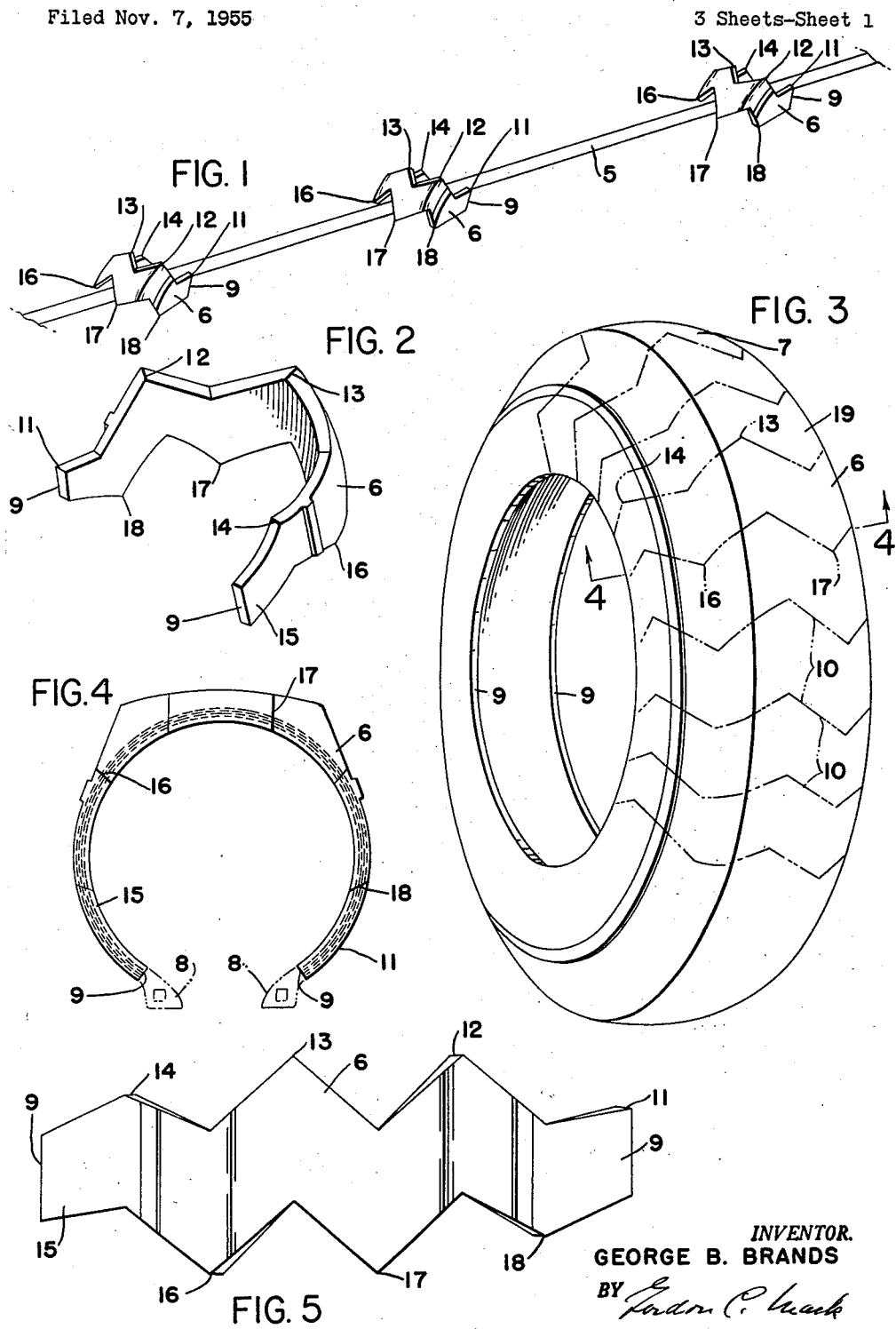
INVENTOR.
GEORGE B. BRANDS
BY
ATTORNEY

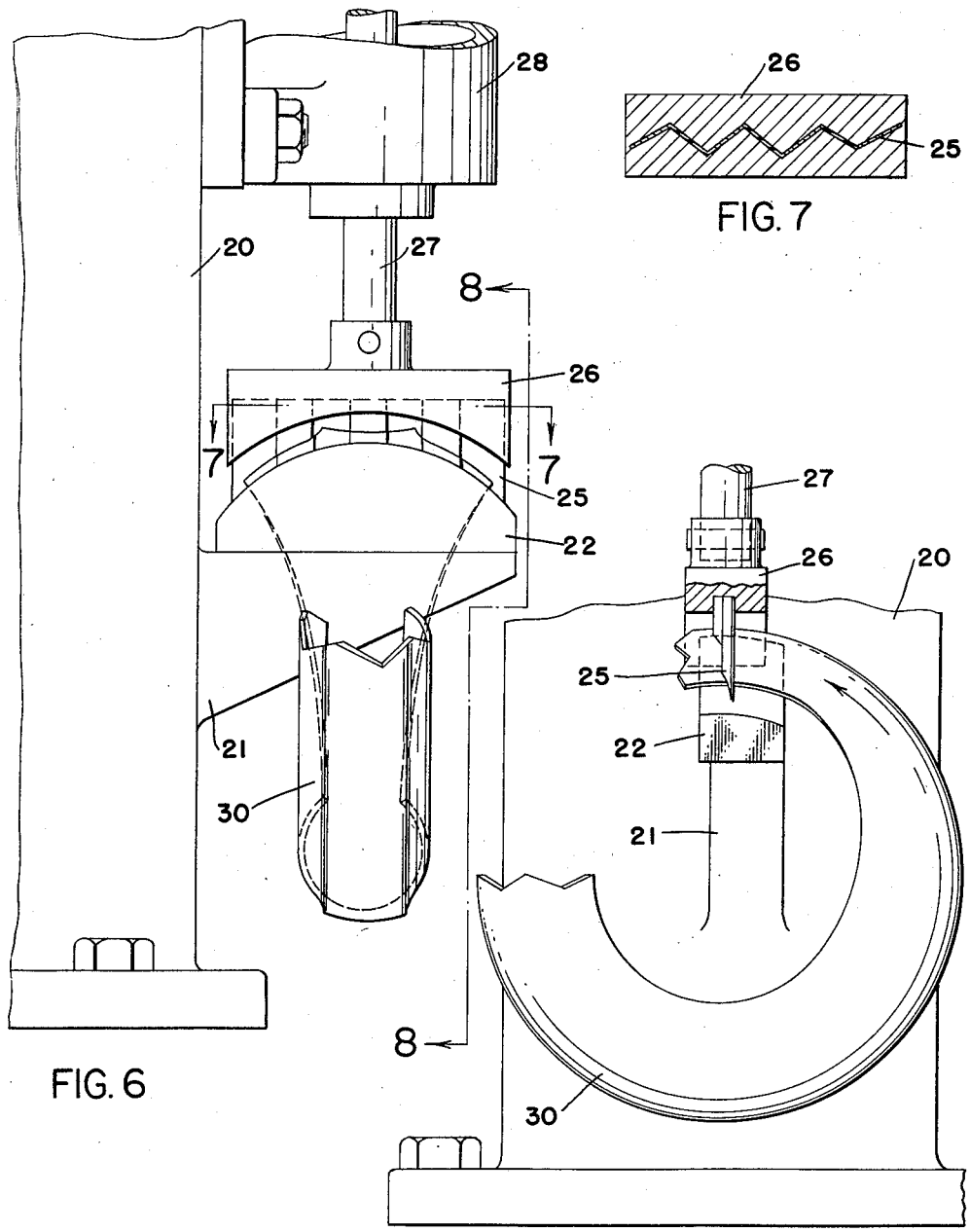

Dec. 16, 1958  G. B. BRANDS  2,864,331
PROTECTOR FOR HIGHWAY MARKINGS
Filed Nov. 7, 1955  3 Sheets-Sheet 3

INVENTOR.
GEORGE B. BRANDS
BY
ATTORNEY

United States Patent Office 2,864,331
Patented Dec. 16, 1958

2,864,331

PROTECTOR FOR HIGHWAY MARKINGS

George B. Brands, Akron, Ohio

Application November 7, 1955, Serial No. 545,310

2 Claims. (Cl. 116—63)

This invention relates to protectors to be placed on freshly applied highway traffic markings to protect them from the traffic until they have dried. The invention includes the protectors themselves, the methods of making and applying them, and apparatus for carrying out the method.

The protectors of this invention are cut from worn automobile tires, or from new tire "rejects" obtained from a tire manufacturer, or the like. All such tires are provided at their inner diameters with wire beads which keep these diameters of constant size.

In preparing the protectors of this invention the tire is first de-beaded. Then the tire is cut crosswise, from one de-beaded edge to the other, to form relatively narrow sectors which serve as the protectors. The edges of these sectors are not smooth but are cut to form at least three points of support at one, or preferably both sides of the protector. The bottoms of the points of support along one edge of a protector all lie in the same radial plane of the tire, and simultaneously rest on any flat surface on which the protector is placed.

Ordinarily the protectors will be cut from the de-beaded tire by a knife blade that is not straight. It may zigzag sharply or it may be curved. It will cross its medial line several times so that the edges of the sectors lying on the two sides of it will both be formed with points of support which hold the main body of the protector out of contact with the freshly applied traffic marking. Usually the tire is at least partially flattened on a mandrel while it is being cut.

The same knife may be used to cut both edges of the protector, or different knives of different design may be used. If the same knife is used the protectors will be stackable in a dove-tail fashion because the cut edges will be complementary. Depending upon the shape of the knife both edges of the protector may be the same, so that either edge may be used as the top, and in that case they will be stackable regardless of which edge is up. The protectors illustrated in the drawings are of this type. Protectors which have a distinguishable top and bottom edge are illustrated by those which have an upward point at the middle of the top, and consequently an indentation at the middle of the bottom. These are stackable in a dove-tail fashion only when the middle point of each is pointed in the same direction. Generally, protectors with an odd number of points of support along one edge will be stackable only if the same edges are up; but those with an even number of points of support are stackable regardless of which edge is up.

The protectors are cut from a passenger tire which may be of any usual size. Ordinarily protectors, when flattened out, will measure about 10 to 15 inches from one de-beaded end to the other. They may be somewhat shorter, and if cut from larger tires, may measure up to 18 to 20 inches or more in length. Ordinarily they will measure at least about 3 inches from one edge to the other, with indentations measuring up to an inch or two deep or more to provide the points of support.

Although the supporting portions of the protector are preferably pointed, and are referred to herein as "points," they may be rounded or flat, etc. Their areas are limited so that when placed on a freshly applied marking, no great damage will be done to the marking on the pavement, and no substantial amount of wet paint will stick to the protector.

The protectors will require at least three points of support along their edges, and as above explained, four points or a larger even number of points may be used to advantage. They are advantageously cut so that when resting on one edge, one corner of the protector (i. e. a corner of a plan view of the flattened protector, as more fully described in connection with the drawings) forms one of the points of support, and when resting on the other edge the corner diagonally opposite this forms one of the points of support. Thus, if there are four points of support on each side of the tire, this will ordinarily include one point of support in the tread area at one side of the center-line of the tire, and in this half of the protector there will be another point of support in the sidewall area of the tire. At the other end of the protector, one point will be formed by the corner of the protector and the other point will be cut from the shoulder area. This will be explained more fully in connection with the drawings.

In the drawings:

Fig. 1 is a view showing protectors spaced along a traffic marking on a highway;

Fig. 2 is a view in perspective of one of the protectors;

Fig. 3 shows a de-beaded tire in perspective, with dot-dash lines to show where the tire is to be cut to form protectors;

Fig. 4 is a section through the tire of Fig. 3, on the dot-dash line at 4—4, except that it has the beads added to illustrate what is removed by de-beading;

Fig. 5 is a plan view of the protector shown in the foregoing views flattened out;

Fig. 6 shows more or less diagrammatically an elevation of equipment used for cutting the protectors from a worn tire, and shows the worn tire in place;

Fig. 7 is a section on the line 7—7 of Fig. 6 through the upper block of the cutter, showing a cross section through the knife blade;

Fig. 8 is a side elevation of the apparatus on the line 8—8 of Fig. 6;

Figure 9:
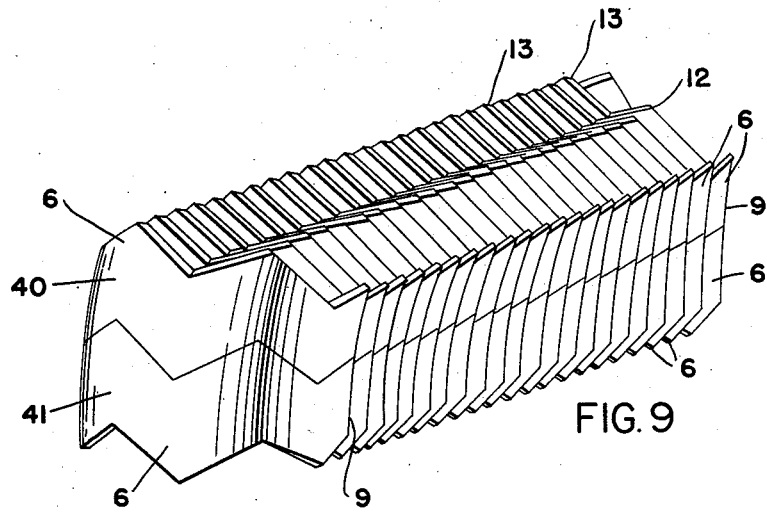
Fig. 9 illustrates how the protectors may be nested and stacked together.

The use of protectors on freshly applied traffic markings is a familiar sight. Their purpose is to mark the newly applied strips, signs, etc., and thus worn traffic from them. Figure 1 shows a freshly applied stripe 5 with several protectors 6 guarding it. The protectors of Fig. 1 are of the type shown in Fig. 2. Figure 3 illustrates a tire from which these protectors are formed by cutting on the dot-dash lines.

The tire 7 is first de-beaded. Figure 4 shows the beads 8. In de-beading the tire will be cut circumferentially on both sides of the wheel opening at about the location of the lines 9, a short distance inwardly from each bead. The de-beaded tire is then cut radially along the dot-dash lines 10 with a knife blade.

Figure 5 shows the preferred form of protector illustrated in Fig. 2, but flattened out. The ends 9 are formed by cutting along the lines 9 of Fig. 4. At the right end of Fig. 5 the upper corner 11 forms one point of support. The point 12 is cut from the shoulder area of the tire and the point 13 is cut from the tread area. The other point 14 is cut from the sidewall area. Conversely, at the bottom of the tire the corner 15 (diagonally opposite corner 11) forms one point of support. The point 16 is cut from the shoulder area and the point 17 is cut from the tread. The point 18 is cut from the sidewall area. When this protector is supported on one edge as illustrated in Fig. 2, it rests on the points 15, 16, 17 and 18. When it is turned over it rests on the points 11, 12, 13 and 14. By studying Fig. 3 it will be seen that when the tire is cut along the line which separates the protectors 6 and 19, the poins 11, 12, 13 and 14 of protector 6 form depressions which separate the points 15, 16, 17 and 18 of protector 19.

If the tire from which the protectors are cut is a worn tire, the tread must still be sufficiently thick to give the protectors cut from it sufficient body to stand erect. A tire in which some of the tread design is still visible is most satisfactory. Nothing is removed from the tire but the beads, so that the protectors include the fabric carcass as well as the outer rubber covering.

Protectors of this preferred design, with four, six or more (an even number) of points of support along each edge, and with both edges complementary to each edge of another protector of the same shape may be cut from other materials or it may be molded from a suitable plastic, or otherwise fabricated.

The protectors may be formed by a very simple cutting device illustrated in Figs. 6–8. This includes a post or supporting element 20 which carries the bracket 21 on which the mandrel 22 is mounted. The knife 25 is carried by the block 26 on the lower end of the rod 27 which is made to reciprocate vertically in the guide member 28. The reciprocating means are not shown, but are of any usual type.

With the rod 27 in its "upper" position, the tire 30 is placed on the mandrel 22. As illustrated, the tire is partially flattened on the mandrel so that it is easily cut by the reciprocating knife 25. The mandrel may be rounded as shown, or the sides may be relatively flat, slanting downwardly. If the tire were not at least partially flatttened it would be necessary for the knife to be moved laterally into the sides of the tire, an operation included in the broadest concept of this invention. This is obviated by at least partially flattening the tires on the mandrel. When the tire is properly placed the knife 25 is moved down and cuts through the tire. The knife is then lifted, the tire is shifted circumferentially a short distance on the mandrel, and the operation is repeated. This distance can, and should be, controlled by stops, or a jig. Thus the tire is cut into sectors and each sector forms a protector.

Figure 10:
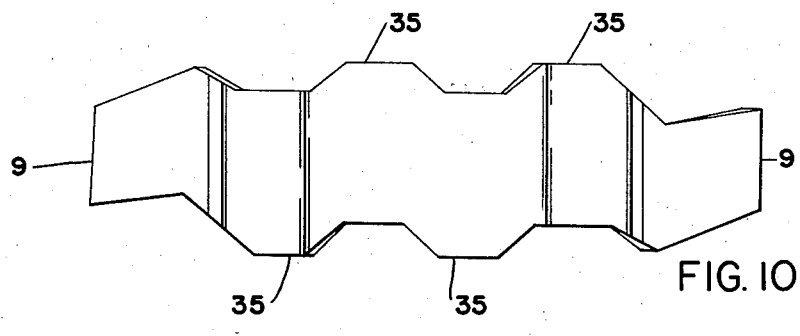
Fig. 10 is a plan view of a modified protector with blunted points of support, flattened out.
Figure 11:
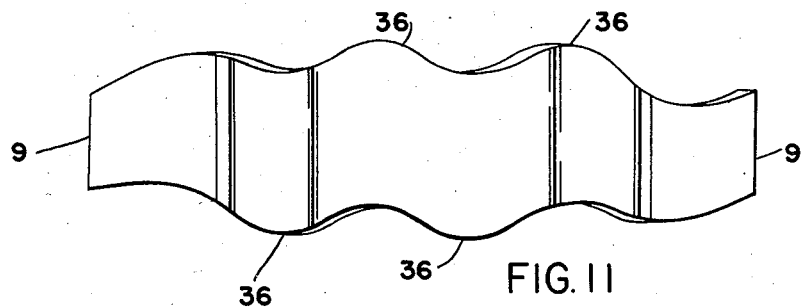
Fig. 11 is a plan view showing another modification of the protector with curved points of support, flattened out.

Figure 7 shows the knife blade used to produce the preferred protectors shown in Figs. 1–5. In practice, to facilitate one knife being employed for various sizes of tires, the blades will extend beyond the ends shown in Fig. 7, in lines from the ends shown and parallel to the medial line of the knife. By blunting the laterally projecting points of the knife blade, a protector of the type illustrated in Fig. 10 is formed. Here the supports 35 are quite blunt but the area contacting the marking on a pavement, has such a small area that no substantial damage is done to the marking, or no substantial amount of paint gets on the protector.

In Fig. 10 the supports 36 are rounded instead of being blunted.

Knife blades of different shapes may be used. For instance, the laterally projecting portions of the knife blade may be parallel and cut narrow projecting areas of the tire to form a support. Such narrow areas which extend outwardly from one edge of a protector will form narrow indentations in the edge of the adjacent protector. These will alternate with one another. Their ends may be blunt or pointed. Thus the points of support may be any desired shape.

After being severed from the tire, each protector tends to assume the arched shape it occupies in the tire. Each arch or protector is identical or substantially so, and thus lends itself readily to being stacked with other protectors of the same design. Thus Fig. 9 shows two tiers 40 and 41 each composed of a large plurality of protectors 6 (of the type illustrated in Figs. 1–4) stacked one within another. The two tiers stack conformably, one on the other, having been cut from a tire by the same knife blade. Such stacking is desirable because it minimizes the space required to store them and also the space required to carry them on the placement vehicle. In practice, the protectors will not stack in the neat manner illustrated in Fig. 9 unless particular care is taken to see that the edges of the adjacent protectors are in exact alignment, and one protector is placed precisely on the protector below it. However, the irregularities in the edges of the protectors may be generally aligned and made to interfit to a certain extent, even though the stack does not present the neat appearance illustrated.

It is conceivable that one might use sectors cut from a tire with a straight knife blade, but such sectors would have a considerable area of contact, and when accidentally moved by traffic would wipe a substantial area of the highway, removing the freshly applied marking and very possibly smearing it on to the adjacent area of the highway. Also, the paint which sticks to the protectors might cause the protectors to stick together when later picked up and placed in the gathering container.

The protectors of this invention can be economically made from cheap starting materials, and their ultimate cost is low compared with the cost of protectors now on the market. Although in general it is contemplated that the protectors will be cut from automobile tires, the preferred design may be otherwise fabricated, as by molding a cheap plastic.

The protectors may be colored to make them more readily observed by the moving traffic.

The drawings and description are illustrative, as obviously changes may be made in the design without departing from the scope of the invention.

What I claim is:

1. A protector for freshly applied highway traffic markings which comprises a sector of an automobile tire including the tread and sidewalls, said sector having tortuous edges defining at least three support portions whereby when a protector is placed on such a marking its contact therewith is limited to said support portions.

2. A protector for freshly applied highway traffic markings which comprises a sector of an automobile tire including the tread and sidewalls only, said sector having tortuous edges defining at least three support portions whereby when a protector is placed on such a marking its contact therewith is limited to said support portions.

References Cited in the file of this patent

UNITED STATES PATENTS

| | | |
|---|---|---|
| 1,713,248 | Zimarik | May 14, 1929 |
| 2,023,576 | Connelly | Dec. 10, 1935 |
| 2,208,080 | Overdorff | July 16, 1940 |
| 2,238,683 | Elliott | Apr. 15, 1941 |
| 2,333,273 | Scanlon | Nov. 2, 1943 |
| 2,567,149 | Errig | Sept. 4, 1951 |
| 2,712,809 | Clarke | July 12, 1955 |